US011868448B1

(12) United States Patent
Chowdhury et al.

(10) Patent No.: US 11,868,448 B1
(45) Date of Patent: Jan. 9, 2024

(54) SHARED DEDICATED HOST RESOURCE GROUPS IN A PROVIDER NETWORK

(71) Applicant: Amazon Technologies, Inc., Seattle, WA (US)

(72) Inventors: Murtaza Muidul Huda Chowdhury, Sammamish, WA (US); Ankit Jain, Seattle, WA (US); Ramapulla Reddy Chennuru, Milpitas, CA (US); Niti S. Khadapkar, Union City, CA (US); Yashi Kamboj, Sunnyvale, CA (US); Xiangyu Ren, Mountain View, CA (US); Anupama Anand, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 369 days.

(21) Appl. No.: 16/908,217

(22) Filed: Jun. 22, 2020

(51) Int. Cl.
| | | |
|---|---|---|
| *G06F 21/10* | (2013.01) | |
| *G06F 9/50* | (2006.01) | |
| *G06F 9/455* | (2018.01) | |
| *G06F 8/61* | (2018.01) | |

(52) U.S. Cl.
CPC .............. *G06F 21/105* (2013.01); *G06F 8/63* (2013.01); *G06F 9/45558* (2013.01); *G06F 9/5005* (2013.01); *G06F 9/5072* (2013.01); G06F 21/1076 (2023.08); G06F 2009/4557 (2013.01)

(58) Field of Classification Search
None
See application file for complete search history.

(56) References Cited

U.S. PATENT DOCUMENTS

| | | | |
|---|---|---|---|
| 8,615,579 B1 | 12/2013 | Vincent et al. | |
| 9,934,269 B1* | 4/2018 | Kahrs | G06F 9/5061 |
| 10,069,680 B1* | 9/2018 | Wylie | H04L 41/40 |
| 11,106,762 B1* | 8/2021 | DeMillo | G06F 21/105 |
| 2010/0205303 A1 | 8/2010 | Chaturvedi et al. | |
| 2011/0010518 A1 | 1/2011 | Kavuri et al. | |
| 2013/0185420 A1 | 7/2013 | Shimogawa | |
| 2015/0026421 A1 | 1/2015 | Nasu et al. | |
| 2017/0315838 A1 | 11/2017 | Nidugala et al. | |
| 2018/0145930 A1* | 5/2018 | Kostov | H04L 67/10 |
| 2019/0065275 A1* | 2/2019 | Wong | G06F 9/5027 |
| 2019/0081924 A1 | 3/2019 | White et al. | |
| 2019/0228134 A1* | 7/2019 | Ohhata | G06F 9/45533 |

(Continued)

OTHER PUBLICATIONS

Non-Final Office Action, U.S. Appl. No. 16/908,170, dated Nov. 26, 2021, 19 pages.

(Continued)

*Primary Examiner* — Wynuel S Aquino
(74) *Attorney, Agent, or Firm* — Nicholson De Vos Webster & Elliott LLP

(57) ABSTRACT

Techniques for host resource group sharing in a provider network are described. A resource share is made of a host resource group made up of dedicated hosts in the provider network. The share provides access to the host resource group of a primary account with one or more other principals—e.g., user accounts, an organization, or a group of users. The other principals can launch compute instances into the host resource group, which may cause the automatic provisioning of new hosts into the host resource group, of the primary account, as needed.

20 Claims, 9 Drawing Sheets

(56) References Cited

U.S. PATENT DOCUMENTS

2019/0258499 A1* 8/2019 Annapragada ............ G06F 8/63
2021/0234715 A1* 7/2021 Liu .................... H04L 41/0816
2021/0349767 A1 11/2021 Asayag et al.

OTHER PUBLICATIONS

Notice of Allowance, U.S. Appl. No. 16/908,170, dated Jun. 22, 2022, 10 pages.

* cited by examiner

| ID 205 | NAME 210 | DESCRIPTION 215 | NUMBER OF LICENSES 220 | LICENSING METRIC 225 | METRIC TO LICENSE RATIO 230 | DAYS OF AFFINITY 235 | LIMIT 240 | ALLOWED TENANCY 245 | PRESERVE HISTORY 250 | RESOURCE IDS; USAGE 255 |
|---|---|---|---|---|---|---|---|---|---|---|
| ABCD1234 | WINDOWS SERVER ENTERPRISE LICENSES | LICENSING RULES DESCRIBING WINDOWS SERVER ENTERPRISE LICENSE AGREEMENT TERMS | 200 | PHYSICAL CORES | 1 | 90 | HARD | DEDICATED HOSTS | YES | I-129381  5<br>H-199121  2<br>MI-168246  1<br>... |
| DEFA5678 | SQL SERVER ENTERPRISE LICENSES | LICENSING RULES DESCRIBING SQL SERVER ENTERPRISE LICENSE AGREEMENT TERMS | 100 | VIRTUAL CPUS | 1 | 0 | HARD | ALL | YES | 5 |
| 1CCA2241 | VENDOR X VIDEO RENDERING LIBRARY LICENSES | LICENSING RULES DESCRIBING VENDOR X VIDEO RENDERING SOFTWARE LICENSE AGREEMENT TERMS | 10 | (<4 GPUS) / (CPU SOCKET) | 1 | 0 | SOFT | ALL | YES | 0 |

290 — ABCD1234 row
295 — DEFA5678 row
297 — 1CCA2241 row

*FIG. 2*

CREATE HOST RESOURCE GROUP

USE A HOST RESOURCE GROUP TO MANAGE HOSTS ASSOCIATED WITH YOUR SERVER-BOUND LICENSES

HOST RESOURCE GROUP DETAILS — 305

HOST RESOURCE GROUP NAME
[ MYGROUP1 ]

DESCRIPTION
[ ]

DEDICATED HOST AUTO-MANAGEMENT SETTINGS — 310

☑ ALLOCATE HOSTS AUTOMATICALLY
☑ RELEASE HOSTS AUTOMATICALLY
☑ RECOVER HOSTS AUTOMATICALLY

ALLOWED INSTANCE FAMILIES
[ ALL ▼ ]

ASSOCIATED LICENSE CONFIGURATIONS — 315

LICENSE CONFIGURATIONS
[ ABCD1234 – WINDOWS SERVER ENTERPRISE LICENSES ▼ ]

SHARING — 320

SHARE HOST RESOURCE GROUP WITH:
[ GROUP: "MYORG1-ENGINEERING" ]

[ CANCEL ]  [ CREATE ]

*FIG. 3*

CREATE RESOURCE SHARE

CREATE A RESOURCE SHARE TO PROVIDE OTHER ACCOUNTS, ORGANIZATIONAL UNITS, OR ORGANIZATIONS WITH ACCESS TO RESOURCES

DESCRIPTION

RESOURCE SHARE NAME

[ MYGROUP1 ]   — 405

RESOURCES
CHOOSE THE RESOURCES TO ADD TO THE RESOURCE SHARE   — 410

SELECT RESOURCE TYPE

[ HOST RESOURCE GROUPS ▼ ]

| | NAME | DESCRIPTION |
|---|---|---|
| ✓ | TESTING-GRP-1 | "OUR HOSTS FOR APP TESTING" |
| ✓ | PROD-GRP-1 | "OUR PRODUCTION HOSTS" |

PRINCIPALS
ADD PRINCIPALS TO THE RESOURCE SHARE. PRINCIPALS CAN BE ACCOUNTS, ORGANIZATIONAL UNITS, OR YOUR ORGANIZATION   — 415

✓ ALLOW EXTERNAL ACCOUNTS

[ 🔍 SEARCH FOR ACCOUNT NUMBER, ORG IDENTIFIER ] [ ADD ]

| USER: | USER500 | ✗ |
| USER: | USER600 | ✗ |
| OU: | MYORG1-ENGINEERING | ✗ |

[ CANCEL ]   [ CREATE ]

*FIG. 4*

SHARED DEDICATED HOST RESOURCE GROUPS IN A PROVIDER NETWORK

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which:

FIG. 2 is a diagram illustrating an exemplary data structure for storing license rules configurations and tracking license usage according to some embodiments.

FIG. 3 is a diagram illustrating an exemplary user interface for host resource group creation and sharing in a provider network according to some embodiments.

FIG. 4 is a diagram illustrating an exemplary user interface for host resource group sharing in a provider network according to some embodiments.

DETAILED DESCRIPTION

Figure 1:
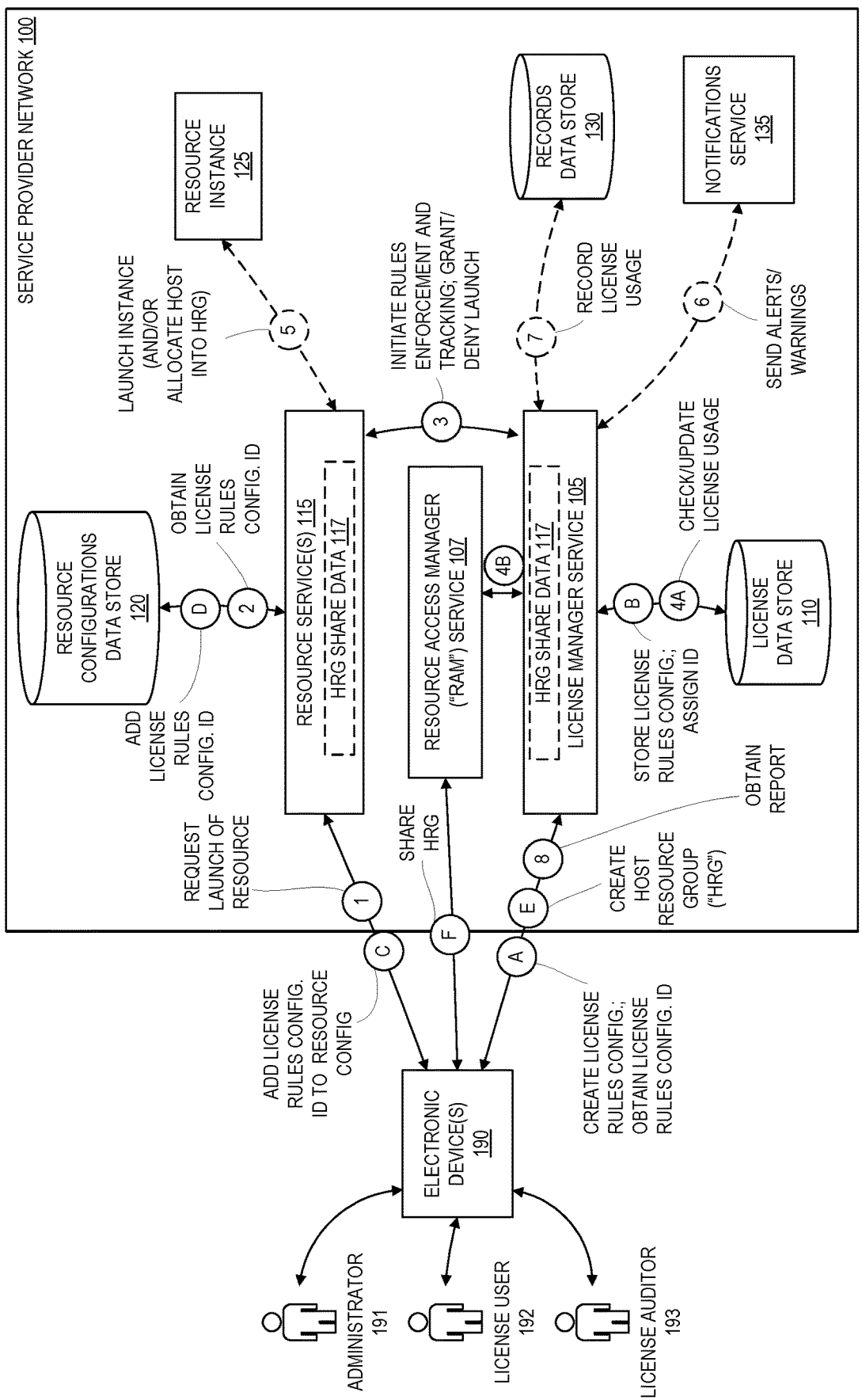
FIG. 1 is a diagram illustrating an environment for assigning and monitoring license usage associated with resources and creating and sharing host resource groups according to some embodiments.

The present disclosure relates to methods, apparatus, systems, and non-transitory computer-readable storage media for cross-account sharing of dedicated host computing devices via shared dedicated host groups. Many servers ("hosts") in a cloud computing environment are virtualized, such that their compute capacity can be shared among different customers who each have access to a portion of the capacity. In contrast, a dedicated host refers to a physical server (in the cloud computing environment) that has its entire capacity dedicated to a single customer. Other customer's compute resources cannot be placed on a dedicated host, regardless of whether the customer to which it is dedicated fully utilizes its capacity. One example use case for such dedicated hosts is for hosting instances that run software which requires a host-bound license (e.g., the customer cannot move the software to a different host under the terms of their software license, and/or the customer licenses the entire host and can run as many copies of the software on that host as they are able).

In some embodiments, a customer may create a host resource group—including a set of zero, one, or more host computing devices that are dedicated to that customer—and configure the host resource group to be shared with other accounts, organizations, and/or groups (e.g., organizational units). For example, many customers have multiple accounts representing different users or organizations within their business, and by sharing a dedicated host group these customers can make more efficient usage of their dedicated host by sharing it across these users or organizations. Thereafter, users may launch compute instances into the customer's host resource group without needing knowledge of the particulars of the dedicated hosts or even knowledge of the group's existence, while customers may easily allow multiple other accounts to utilize a set of dedicated hosts, e.g., and efficiently make use of licenses that may be tied to these hosts. In some embodiments, customers may similarly remove the host resource group from being shared with other accounts, organizations, or groups, allowing customers control over who is able to utilize these resources.

For example, in some embodiments a set of one or more host computing devices of a host resource group can be shared across accounts of the provider network. Thus, when a host computing device is allocated in the primary account—whether due to actions of the customer (e.g., via the primary account) or a secondary account that the group is shared with—the host can be automatically shared with all approved accounts immediately without needing to wait for manual or other asynchronous processes to share these resources. For example, hosts may be automatically provisioned into a primary account's host resource group when needed to support a license for a new instance to be launched (perhaps for a secondary account), providing on-demand host allocation.

Within a service provider network, the management of the utilization of resources is a key aspect, as customers may need to pay for each license used, and the cost of hosts that are dedicated (e.g., per hour), etc. However, when different users of an organization or group rely on instances requiring a host-tied license, each of these users may acquire a separate dedicated host and perhaps not fully utilize these hosts. This is extremely wasteful of resources and costly, as it results in a "fragmentation" of capacity due to these different users (of a same organization) using their own dedicated hosts. To alleviate such a possibility, in some embodiments, users may use a same host resource group that is shared across multiple users, and thus the set of hosts in the host resource group can be used to capacity. Moreover, instead of requiring users to allocate new hosts when additional capacity is required, in some embodiments new hosts can be automatically provisioned into a host resource group as needed, relieving administrative burden, eliminating misconfigurations, and resource waste.

In some embodiments, a license manager service (or "LMS") of a service provider network can enable its users to bring their own software licenses to the cloud or use licensed machine images provided by the provider network. Often, a license will include terms that require a user to license an entire server device (or, "host computing device"), rather than just a compute instance such as a virtual machine. For example, core-based licensing requires all physical cores in a server device to be licensed. A service provider network may allow its users to utilize such licenses within the provider network by providing dedicated host computing devices that are reserved only for these users, which can then be used to launch one or more instances running programs that require such a license. The license manager service can assist users by attaching licensing rules to an existing host computing device, or allow users to launch compute instances using a machine image that has an attached license such that the license is automatically attached to the host computing device.

For new launches of compute instances, the instances can be automatically placed on a suitably licensed host computing device. When a new host computing device is required in order to launch another instance that requires a particular license, the license manager service can automatically provision a new dedicated host computing device in the user's account, attach the required license, and launch the instance. A dedicated host is a server computing device that, at least for a period of time, is solely dedicated or "reserved" only for a single customer, and thus other customers are unable to use that device (e.g., by launching instances onto it). As described herein, a LMS can allow a customer (associated with one or more accounts of the service provider network, which may correspond to one or more users of the service provider network) to define a host resource group for dedicated hosts (e.g., using an administrator account), and share the host resource with other accounts (associated with the customer or optionally not), an entire organization (a collection of associated accounts), a group (e.g., a division of an organization, such as an "engineering" department of a corporation), etc. The LMS may then, upon a request to launch an instance (e.g., received at a hardware virtualization service), determine that the instance is to be launched within the host resource group, determine whether the host resource group is currently shared with the requesting account/user, and allow or deny the launch in the host resource group accordingly. In some embodiments, when such a launch requires a new host to be added into the host resource group (e.g., due to a need for a slot of a host computing device having a particular associated license), the LMS 105 can, when deemed appropriate, cause a new host to be provisioned into the host resource group—of the customer—for the compute instance to be placed.

FIG. 1 is a diagram illustrating an environment for assigning and monitoring license usage associated with resources and creating and sharing host resource groups according to some embodiments. At a high level, the environment includes one or more resource services 115, a resource access manager ("RAM") service 107, and an LMS 105 that are part of a provider network 100.

According to some embodiments, the service provider network 100 includes an LMS 105 to help users of the provider network 100 manage and track computer software and/or hardware licenses and usage of software and/or hardware under licenses. The LMS 105 allows users to leverage existing licenses when using resources within the provider network to avoid the additional cost of obtaining additional, possibly duplicate licensing rights. The LMS 105 can proactively enforce licensing rules to aid in license compliance for the user and/or send alerts relating to license usage or consumption to the user to reduce the risk of license overages and non-compliance. In addition, in some embodiments the LMS 105 provides license usage reports to provide users with visibility into license usage and to comply with vendor audits.

Users of the provider network 100 can model existing license agreements within the LMS 105 using a licensing construct. The modeled license forms part of a license rules configuration (e.g., stored in a license data store 110 such as a database or other data structure) that includes properties pertaining to the license, such as a user-specified metric that identifies how license consumption is measured, where the software can be run, a user specified-limit that identifies how much consumption is permitted, etc. When a user attempts to launch an instance of a resource, such as a compute instance (e.g., a virtual machine (VM)), a database instance having a particular software and hardware configuration, etc., the LMS 105 tracks the consumption of any licenses associated with the software or hardware configuration and may, in some embodiments, allow or prevent the launch. For example, a user might have a license with a particular operating system software vendor that allows the user to use the software on ten separate processor cores. The user defines the license metric (e.g., processor cores) and limit (e.g., ten) with the LMS 105. When the user attempts to launch an instance of a resource that has a software configuration that includes the operating system software and an underlying hardware configuration with two processor cores, the LMS 105 checks whether the license metric limit would be exceeded—e.g., whether the addition of two more physical cores (to be associated with the requested instance) would exceed the limit of ten (based on any existing instances that might be consuming the license). For example, if nine or ten cores were currently in use under the license, the addition of two more cores would cause the limit (of ten) to be exceeded and thus the LMS 105 may deny the launch and alert the user of an overage. Alternatively, if eight or fewer cores were currently in use under the license, the addition of two more cores would not cause the limit (of ten) to be exceeded, and thus the LMS 105 may allow the launch to occur.

In some embodiments, the LMS 105 includes one or more application programming interfaces (APIs) that allow users and/or other components of the provider network 100 to communicate with the LMS 105. Users can create license rules configurations with the LMS 105 that specify the metric by which a license is consumed (e.g., central processing unit (CPU) sockets), a limit on license consumption (e.g., "5"), when or how the software associated with the license can be run (e.g., within a service provider environment or within a user operated location), etc. Leveraging a resource service 115 (e.g., a hardware virtualization service, a database service, etc.), users can create instances of computing-related resources that consume an amount of the specified metric (e.g., a two-socket server consumes two sockets of the available license limit), and the LMS 105 tracks this license usage.

The environment illustrated in FIG. 1 includes one or more electronic devices 190 (e.g., executing client applications, commonly referred to as "clients") in communication with a provider network 100. Communications between the electronic device 190 and the provider network 100 occur across one or more intermediate networks such as the Internet (not shown). Further, communications between the electronic device 190 and the provider network 100 may occur via one or more "frontend" services that are part of the provider network 100 (not shown) and that facilitate communications to "backend" services, which, in some embodiments, include the LMS 105, the resource services 115, and/or RAM service 107. Exemplary frontend services may expose APIs to provide users with the ability to interact with the backend services. Interactions may occur via a web-browser based interface, a command-line interface (CLI), via software development kit (SDK) integration, etc. Other exemplary frontend services include access control services that verify the identity of a user and his or her associated permissions to access various computing-related resources within the provider network 100.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services. Thus, such cloud provider networks provide services to multiple users, and thus may be referred to as being multi-tenant service provider networks.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

Note that the users of the provider network 100 may utilize one or more user accounts that are associated with a customer account (e.g., a business or organization may have a customer account that includes multiple user accounts of different types for its employees), though these terms may be used somewhat interchangeably depending upon the context of use. Exemplary user types include license administrators 191, license users 192, and license auditors 193. In some embodiments, only the administrator 191 can create or modify license rules configurations with the LMS 105, either the administrator 191 or the license user 192 can instantiate resources within the provider network 100 that may require licenses, and the license auditor 193 may be limited to accessing records related to license usage; each scenario is described in greater detail below.

The resource services 115 provide users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing-related resources may be provided as services that allow a user to create instances of the underlying compute resource. One exemplary resource service 115 is a hardware virtualization service that allows users to create compute instances comprising one or more software programs executed by a particular hardware configuration, which may be actual or virtualized. Another exemplary resource service 115 is a database service that allows users to create database instances comprising one or more software programs, including database software, executed by a particular hardware configuration.

In some embodiments, a resource configurations data store 120 maintains resource configurations. Resource configurations can specify the hardware configuration and/or the software configuration for one or more resource instances that can be launched within the provider network 100. Exemplary resource configurations include instance types, machine images, launch templates, and formation templates. Instance types represent hardware configurations without specifying any particular software executed by the hardware. Machine images represent software configurations without specifying the underlying hardware in which the software is executed. For example, a compute instance type might specify a number of CPUs in a computer system, an amount of memory (e.g., random-access memory) in the computer system, and an amount of storage in the computer system (e.g., from a solid-state drive), while a machine image might specify an operating system and set of software programs that are executed within the operating system. Launch templates may specify both an instance type and a machine image, and formation templates may specify the instance type and machine image of multiple instances, including potentially additional intra-instance communication settings, etc. (e.g., virtual network configurations). Resource configurations data store 120 may be one or more storage locations within the provider network 100 that are accessible by one or more users (e.g., a public data store with pre-configured machine images, another public data store with pre-configured launch templates, a private data store with a specific user's formation templates, etc.).

In some embodiments, resource configurations have an associated set of properties that characterize the configuration. The properties associated with a resource configuration may be stored along with the resource configuration in the resource configurations data store 120 or associated with the resource configuration by the resource service 115. Properties may be implicitly or explicitly tied to a resource configuration. For example, a formation template might have an implicit property corresponding to an explicit property of an instance type included in the formation template. Exemplary properties associated with a software configuration include an identity of the software program(s), vendor(s), and version(s) of the included software (e.g., [{"Vendor":"Ubuntu", "Program":"Linux", "Version": "18.04"}, {"Vendor":"Oracle", "Program":"Database", "Version":"12.1.0.1"}]).

A variety of properties can be used to characterize hardware configurations. Exemplary properties include performance properties such as by CPU clock speed, number of CPU cores, memory throughput (e.g., gigabytes (GB) per second), storage throughput, networking throughput, etc. Other exemplary properties include physical properties such as a type or number of CPUs, an amount of memory (e.g., random-access memory (RAM)), an amount or type of storage (e.g., solid-state drives), whether the instance includes dedicated accelerator hardware, the number of accelerators, etc. Additional properties associated with hardware configurations include whether the performance is in a virtual or physical computing environment (e.g., whether using virtualization technologies or running on a bare-metal computer system), whether the hardware configuration is dedicated to a particular user or shared amongst unrelated users, the location of the computer system (e.g., physically or logically, such as relative to other computer systems within a network or on a particular network). For example, in a shared, virtual hardware configuration, the performance properties might specify the number of virtual CPUs (vCPUs) and associated amount of memory accessible to the vCPUs associated with a single instance of the hardware configuration, of which the underlying physical hardware might be able to host up to four, eight, sixteen, or even more instances of the virtual configuration for different users.

Users of a service provider network 100 may utilize a resource access manager ("RAM") service 107 to "share" ones of their resources (available within the provider network) with other users, organizations, or groups of users. In some embodiments, users may thus create or manage resources from a central account and share these resources with other accounts. The RAM service 107 may thus allow customers of the provider network to reduce operational overhead, as resources can be centrally created and the RAM service 107 can be used to share those resources with other accounts, eliminating the need to provision duplicate resources in every account, which reduces operational overhead. The RAM service 107 may also provide customers with increased security and consistency, as it can govern the consumption of shared resources using policies and permissions to achieve security and control while offering a consistent experience for sharing different types of resources. Moreover, the RAM service 107 can provide visibility and auditability to customers, as usage details for shared resources can be easily obtained (e.g., via an integration with a non-illustrated monitoring service of the provider network, for example), thus providing comprehensive visibility into shared resources and accounts.

In some embodiments, users can use the RAM service 107 to share host resource groups. After a host resource group and license configuration is shared, accounts associated with the share can each launch instances into the shared host resource group. As needed, new host computing devices can be allocated in the account that owns the host resource group, while the member account (that launched the instance) retains ownership of the individual instances.

An overall flow of assigning, sharing, and monitoring license usage associated with new resources in the provider network 100 is outlined by the encircled letters (A) through (G) and numbers (1) through (8) in FIG. 1. Circles (A)-(D) generally relate to creating license rules configurations; circles (E)-(G) generally relate to creating and sharing host resource groups; circles (1)-(5) generate relate to license consumption (e.g., when launching a resource instance); and circles (6)-(8) generally relate to license usage monitoring.

At circle (A), an administrator 191 can cause an electronic device 190 to send a message to the LMS 105 to create a license rules configuration. The message may be sent via a frontend interface (e.g., via a CLI, web-browser interface, SDK, etc.). In an exemplary embodiment, a license rules configuration includes various properties that can be used to represent an underlying license agreement and configure how the LMS 105 operates as part of monitoring license usage.

Exemplary properties may include one or more of the following:
  Name: A user-specified name that can be used to identify the license.
  Description: A user-specified description that can provide additional details regarding the license.
  NumberOfLicenses: A user-specified value representing the number of licenses available under the license agreement.
  LicensingMetric: A user-specified metric by which licenses are consumed under the license agreement. Exemplary metrics include performance metrics (that relate to the hardware configuration parameters described above) or other forms of metering found in license agreements, such as physical processor sockets (e.g., the physical interface between a CPU and a motherboard), physical computer systems (e.g., whether single- or multi-CPU coupled via a motherboard), virtual measurements (e.g., vCPUs), whether the computer system is within the provider network 100 or in some other location, etc. Metrics may be a single metric, as described above, or defined as a function of multiple metrics, such as a number of vCPUs allowed per physical socket or a number of instances allowed per physical computer system, etc.
  MetricToLicensesRatio: A user-specified value representing a ratio that relates the LicensingMetric to the NumberOfLicenses (if different than 1). For example, if each license grant permits executing software on two cores, the value of MetricToLicensesRatio would be 2.
  DaysOfServerAffinity: A user-specified value representing an amount of time that a license remains attached to a particular server device for server-bound licenses. Some licenses limit the frequency at which a software program can be moved between different compute resources (e.g., cannot be executed until 90 days after first being executed on a given server device).
  AllowedTenancy: A user-specified property that indicates whether the licensed subject matter can be used on a system shared with other users or dedicated to a single user. Exemplary values include "Shared," "Dedicated," "Any."
  UsageLimitType: A user-specified property that indicates to the LMS 105 whether it should limit new resource instance creation if a new resource instance would cause the NumberOfLicenses to be exceeded or otherwise violate the underlying license agreement.
  PreserveHistory: A user-specified Boolean to indicate to the LMS 105 whether it should keep a license usage history.
  PreserveHistoryLocation: A user-specified data store in which to store the license usage history (if PreserveHistory is true).
  PreserveHistoryRetentionPeriod: A user-specified property representing an amount of time to retain the license usage history (e.g., 90 days).
  PreserveHistoryFrequency: A user-specified property representing a frequency (e.g., in hours) at which to record current license usage. No value indicates license usage should be updated on launch and termination of a resource instances.
  ExpirationDate: A user-specified property that indicates the expiration date of the license agreement.
  Additional {LicensingMetric, NumberOfLicense } property pairs if the underlying license agreement provides multiple license consumption methods, optionally including a property that includes a formula for calculating the total license usage (when multiple consumption methods are used) and/or a property that prioritizes methods of license consumption.

Other embodiments may include more, fewer, or a variable number of license properties in a license rules configuration, and the properties may represent a variety of factors such as those similar to those described above and others.

At circle (B), having received the license properties, the LMS 105 creates a license rules configuration that includes the properties in the license data store 110, which may be a database or other storage location that maintains the license rules configurations. In some embodiments, the license data store 110 provides version-controlled storage of the license rules configuration to manage updates, track changes, and provide the ability to export and import licensing definitions. Also as indicated at circle (B), the LMS 105 assigns a license rules configuration identifier (also referred to as a license identifier) that uniquely identifies the license rules configuration from other license rules configurations (either globally within the provider network 100 or locally within the user account). The LMS 105 sends the assigned license identifier to the electronic device 190, as indicated at circle (A).

At circle (C), having received the license identifier of the new license rules configuration, an administrator 191 can cause an electronic device 190 to send a message to the resource service 115 to add the license identifier to or to otherwise associate the license identifier with one or more resource configurations stored in the resource configurations data store 120 (e.g., instance types, machine images, launch templates, and formation templates). For example, a license for a particular operating system may be associated with a machine image utilizing that operating system. As above, the message may be sent via a frontend interface (e.g., via a CLI, web-browser interface, SDK, etc.). Multiple license identifiers may be added to each resource configuration for configurations that leverage multiple licensed resources (e.g., multiple software programs). At circle (D), the resource service 115 adds the license identifier to the resource configuration in the resource configurations data store 120 (e.g., as a tag or property of the resource configuration).

In some embodiments, at circle (E), an administrator 191 may interact with the LMS 105, e.g., via a client executed by the eletronic device(s) 190 such as a web-based application, a CLI, library or SDK component, etc., to create a host resource group (also referred herein as an "HRG"). Aspects of host resource group creation are presented herein with regard to FIG. 3 and the associated description. The LMS 105 may store host resource group information in a data store.

At circle (F), the administrator 191 user may interact with a RAM service 107 to share the host resource group. Aspects of host resource group sharing are presented herein with regard to FIG. 4 and the associated description. In some embodiments, the administrator 191 user may select the host resource group (or provide a unique identifier thereof, which may be globally unique or unique within the context of the account) and select one or more other user accounts, organizations, groups, etc. (or provide identifiers thereof) that are to be given access to the host resource group. In some embodiments, the RAM service 107 stores a mapping between a host resource group (e.g., an identifier of an HRG) and the one or more other entities (e.g., identifiers of user accounts, organizations, groups, etc.). Optionally, in some embodiments, some or all of this mapping information is sent to the LMS 105 and/or resource services 115 and stored as HRG share data 117, either in a volatile cache/memory or persisted in a non-volatile storage. This HRG share data 117 may be used by the LMS 105 and/or resource service(s) 115 to control access to the host resource group, and may be quickly accessed (e.g., in the launch path of a requested "run instance" request) locally by these components, though in some embodiments the LMS 105 and/or resource service(s) 115 may instead send a request to the RAM service 107 for the HRG share data 117, which may be a complete mapping of the HRG to associated accounts/organizations/groups, or may be a simple "YES" or "NO" indicating that a particular account (e.g., specified in the request) is or is not currently provided access to the HRG. For example, as illustrated with regard to circle (4B) and described further herein, as part of initiating rules enforcement and allowing or denying a launch, the LMS 105 may check a requested machine image to be launched, identify that a HRG is attached to the machine image, and send a request to the RAM service 107 (e.g., identifying the account and the HRG) seeking an indication of whether the account is able to able to launch into the HRG, and the RAM service 107 may send back a YES/NO (or TRUE/FALSE, etc.) message in response. In some embodiments, the LMS 105 may determine whether the HRG will need another host allocated for the launch; if so, the LMS 105 may cause such a host to be allocated.

Alternatively, in some embodiments, the host resource group may be shared during the creation of the host resource group itself (such as via the exemplary interface of FIG. 3). In such implementations, the LMS 105 may store the HRG share data 117 itself and may or may not distribute it to other entities such as the RAM service 107 and/or resource service(s) 115. Alternatively, the LMS 105 may utilize APIs to communicate with the RAM service 107 itself instead of requiring the user to separately interact with the RAM service 107, and thus the RAM service 107 may again distribute the HRG share data 117 to the LMS 105 and/or resource service(s) 115 at circles (G1)-(G2).

Thereafter, at circle (1), after a license rules configuration is created and added to a resource configuration, a license user 192 can cause an electronic device 190 to send a message to the resource service 115 to request the launch or instantiation of a resource. Exemplary messages might identify an instance type and a machine image, a launch template, or a formation template, and are again sent via a frontend interface as described above. The request may specify that the instance is sought to be launched into the host resource group, though in some embodiments the host resource group is not identified in the request. For example, a machine image sought to be launched may be associated with a particular license, which can be used to identify the "primary" account (that configured the license) and the host resource group associated with the license and/or primary account.

At circle (2), the resource service 115 obtains the license identifier(s) added to the resource configuration in the resource configurations data store 120 based on the resource configuration identified in the request. In addition, the resource service 115 obtains other properties associated with the resource configuration (e.g., properties associated with the software or hardware configuration of the requested resource configuration).

At circle (3), the resource service 115 sends a message to the LMS 105 that requests permission to launch a resource instance. The message may be sent to an API that is part of the LMS 105 and allows for backend services to interact with the LMS 105. The message may include the obtained license identifier(s) and other properties associated with the resource configuration (e.g., number of vCPUs associated with the resource configuration requested at circle E). The message may further include a preliminary resource identifier to identify the resource instance 125 if permission is granted.

In some embodiments, the request for permission is sent via a synchronous interface to cause the resource service 115 to delay launching the resource instance 125 until it receives permission from the LMS 105, thereby avoiding license overages.

At circle (4A), the LMS 105 obtains one or more properties associated with the license rules configuration identified by the license identifier and performs a rules check to determine whether instantiation of the resource instance is permissible under the license rules configuration. To do so, the LMS 105 evaluates the resource configuration properties against a set of rules specified by the license properties.

In some embodiments, the LMS 105 evaluates whether the resource configuration properties include an identification of the metric identified by the LicensingMetric property. For example, if LicensingMetric is vCPUs, the resource configuration properties includes a value for or comparable to vCPUs. If the resource configuration cannot be evaluated against the LicensingMetric, the rule is violated. In some embodiments, the LMS 105 evaluates whether the amount of the LicensingMetric identified by the resource configuration properties as adjusted by the MetricToLicensesRatio property, if other than 1, does not exceed the NumberOfLicenses property after accounting for current license usage. For example, this rule would not be violated if the resource configuration properties identify two vCPUs, the MetricToLicensesRatio indicates that two vCPUs consume one license, the NumberOfLicenses is one-hundred and the LMS 105 determines there are five licenses used (i.e., indicating 95 licenses are available). In some embodiments, the LMS 105 evaluates whether that the resource configuration properties indicate the underlying hardware supporting the resource instance is consistent with the AllowedTenancy property. For example, a shared hardware configuration (supporting multiple VMs of different users or customers) would fail a rule check if the AllowedTenancy property required Dedicated tenancy. In some embodiments, the LMS 105 evaluates whether the resource configuration properties indicate the resource instance can be traced to particular physical hardware. For example, a virtual hardware configuration rather than a physical hardware configuration would fail a rule check if the DaysOfServerAffinity property was greater than zero (indicating the license had to be tied to a physical server). In some embodiments, the LMS 105 verifies that the ExpirationDate property does not indicate the license has expired. The set of rules evaluated as part of a compliance check can vary from one embodiment to another.

This set of rules may also include a host resource group analysis, e.g., determining that the launch is to occur into a particular host resource group, and checking the HRG share data 117 (locally cached, or obtained via requesting it from the RAM service 107) to determine whether the requesting user account has current access to the host resource group (i.e., whether the host resource group is currently shared with that account). Additionally, in some embodiments, the LMS 105 may check to determine whether another host needs to be deployed into the host resource group for the instance to be placed, such as when there is not sufficient resource availability (e.g., instance "slots") in the set of host computing devices currently making up the host resource group that have the needed host licenses. This check may also include determining whether additional licenses exist that can be used by a new host.

In some embodiments if one or more of the rules are violated, the LMS 105 proceeds based on the value of the UsageLimitType property in the license rules configuration. If the UsageLimitType property indicates there is a hard limit on license consumption, the LMS 105 responds to the resource service 115 by denying the request for permission to launch the resource instance. In some embodiments, the LMS 105 can cause the resource service 115 to propagate an error message to the license user 192 that includes the reason for the failure to launch the resource instance (e.g., launching would exceed the NumberOfLicenses property). In some embodiments, the error message can be tailored by the license administrator 191 during configuration of the license rules configuration. If the UsageLimitType property indicates there is a soft limit on license consumption, the LMS 105 responds to the resource service 115 by granting the request for permission to launch the resource instance.

Additionally, as illustrated with regard to circle (4B), the LMS 105 may determine whether the account is able to launch into the HRG. For example, the LMS 105 may identify the requested machine image to be launched, identify that a HRG is attached to (e.g., associated with) the machine image, and send a request to the RAM service 107 (e.g., identifying the account and the HRG) seeking an indication of whether the account is able to able to launch into the HRG. Thereafter, the RAM service 107 may send back a response message with the indication, e.g., YES/NO, TRUE/FALSE, or the like. In some embodiments, the LMS 105 may also determine whether the HRG will need another host allocated for the launch (such as when no slot (or potentially reconfigurable slots) exist that can run the instance); if so, the LMS 105 may cause such a host to be allocated, e.g., by interacting with another service of the provider network.

When none of the rules are violated, the LMS 105 can grant the request to launch the resource instance from the resource service 115. In some embodiments, the grant or denial of permission to launch a resource instance may depend on the specific rule or rules the LMS 105 determined were violated. In some embodiments, such as when the LMS 105 determines that an additional host is to be added into the host resource group to accommodate the launch, the LMS 105 may send control messaging (e.g., to the resource service(s) 115) to cause a host to be allocated into the host resource group, which may occur before or after the grant of permission to launch.

When the LMS 105 grants permission to the resource service 115 to launch the resource instance, the LMS 105 may update the license data store 110 with a record of the preliminary resource identifier sent with the request for permission to aid in tracking current license usage. In some embodiments, the resource service 115 assigns a resource identifier after receiving permission and sends the assigned resource identifier to the LMS 105. Upon receiving permission, the resource service 115 launches the resource instance 125, as indicated at circle (5), onto a host of the host resource group having sufficient resource availability for the launch and the necessary host license(s). In some embodiments, at this point the resource service(s) 115 may itself perform a permissions check to ensure that the requesting user does currently have access to the host resource group (e.g., via cached HRG share data 117 and/or querying the RAM service 107), which could potentially change during the course of a launch, or the HRG share data 117 may have just been updated by the RAM service 107 to reflect an earlier sharing change, etc.

Returning to circle (4), the LMS 105 can determine existing license consumption in a variety of ways. For example, the LMS 105 can update a data structure associated with the license rules configuration in the license data store 110 each time it grants permission to launch a resource instance with the number of licenses consumed by the permitted resource instance. The number of consumed licenses may be stored without attributing consumption to any particular resource instance (e.g., 50 consumed licenses) or attached to each permitted resource instance (e.g., resource identifier A is attributed 5 licenses, resource identifier B is attributed 1 license, etc.). In some embodiments, if the number of licenses consumed by each resource instance is constant, the LMS 105 can track the identity of each launched resource instance and determine the number of consumed licenses based on the number of tracked instances.

At circle (6), the LMS 105 can cause a notifications service 135 to issue notifications to users. The content of and conditions for sending a notification may be configured by the license administrator 191 when creating the license rules configuration, for example. Exemplary notifications include: sending a warning when existing license consumption approaches the NumberOfLicenses value (e.g., when an absolute or relative threshold number of consumed licenses are reached or soon to be reached); sending an alert if a request to launch an instance is denied, the alert identifying the requested resource configuration, the license identifier that failed a compliance check, and/or an identity of the license user 192 that initiated the request; sending an alert or warning when a license overage occurs (e.g., when UsageLimitType permits launching additional resource instances despite exceeding NumberOfLicenses), etc.

In some embodiments, an administrator 191 user may seek to revoke the share of a host resource group to one, multiple, or all other users, organizations, and/or groups. The administrator 191 user may thus interact (via a client) with the LMS 105 and/or RAM service 107 to update the share, e.g., be "de-selecting" one or more associated accounts. In response, the LMS 105 may send a notification via use of notifications service 135 to the affected users (e.g., those users who no longer have access to the host resource group), which may specify that the users need to move or terminate any of their instances from the host resource group. In some embodiments, such an eviction notification may specify a period of time or a deadline time when any such instances will be halted, terminated, automatically migrated out of the host resource group, or otherwise disconnected should the user not comply with the request to remove the instance(s). In this case, the LMS 105 may then wait until this point in time has been reached, identify any remaining instances that need to be removed, and perform the necessary actions (e.g., halting, terminating, suspending, migrating, etc., the instance(s)).

At circle (7), the LMS 105 records license usage history in a records data store 130 in some embodiments, depending for example on the value of the PreserveHistory property of the license rules configuration. When PreserveHistory is true, the LMS 105 records license usage history in the records data store 130 as specified by the PreserveHistoryLocation property. Depending on the value of the PreserveHistoryFrequency property, the history may be recorded in a change-based log that is updated each time a resource instance is launched or terminated (e.g., when PreserveHistoryFrequency is unspecified) or a snapshot-based log that includes point-in-time license usage of any existing resource instances (e.g., when PreserveHistoryFrequency is set to 2, 4, 8, etc. hour intervals).

At circle (8), users can request license usage reports or pull data relating to license usage (e.g., current usage as determined by the LMS 105 or historical usage as recorded in the records data store 130). These reports or data allow users to view license consumption in detail to identify which resources are consuming licenses, easily comply with audit requirements, or to allow license auditors 193 direct access to license usage history to avoid interrupting operations to comply with audit requests. The reports or data may also indicate which other users are using the host resource group and to what degree—e.g., which instances are currently running or have run in the group, where they are placed, what amount of resources they are consuming (e.g., processing, bandwidth, etc.), or other information allowing the "primary" account to determine the current and/or historic utilization of the host resource group.

In some embodiments, if the properties identifying the software programs associated with a software configuration are available, adding a license identifier to a resource configuration may be omitted. In such cases, the resource service 115 can request permission to launch an instance via a message to the LMS 105 that includes properties associated with the software configuration (without looking up or sending a license identifier as described herein). The LMS 105 can match the software programs associated with the resource configuration to license rules configurations within the license data store 110 as part of performing compliance checks (e.g., based on a Name property or some other property that identifies the software program).

In some embodiments, a user such as license administrator 191 can register certain resource configurations as a property within a license rules configuration. When the resource service 115 receives a request to launch a resource instance (e.g., at circle (1)), the resource service 115 can send the identity of the resource configuration (e.g., instance type, machine image, launch template, or formation template) to the LMS 105 along with the request for permission to launch the resource instance. The LMS 105 can match the received resource configuration with resource configurations specified in properties within the license rules configuration as part of performing compliance checks.

In some embodiments, the LMS 105 may have access to the resource configurations data store 120 or a replica of the resource configurations data store 120. When the resource service 115 receives a request to launch a resource instance, the resource service 115 can send the identity of the resource configuration (e.g., instance type, machine image, launch template, or formation template) to the LMS 105 along with the request for permission to launch the resource instance. The LMS 105 can look up properties associated with the received resource configuration within the resource configurations data store 120 for use in compliance checks without receiving the properties from the resource service 115.

In some embodiments, a default set of hardware and/or software configuration properties associated with a resource configuration may not include a property that corresponds to the LicensingMetric property in the license rules configuration. In such cases, the license administrator 191 may tag the resource configuration with a key-value pair to associate a value for the LicensingMetric with the resource configuration. For example, the key may have a reserved name that, if defined, can be obtained by the LMS 105 before granting or denying permission to launch a resource instance to the resource service 115.

In some embodiments, a software vendor rather than a license administrator 191 creates a license rules configuration for a software product. In acquiring the software product, the software vendor may export the license rules configuration so the license administrator 191 can import it into the user's license data store 110, or the software vendor may share the license rules configuration with the user via the license data store 110.

FIG. 2 is a diagram illustrating one exemplary data structure for storing license rules configurations and tracking license usage according to some embodiments. As illustrated in FIG. 2, the exemplary data structure includes entries 290, 295, and 297. Such a data structure (e.g., a relational database table or tables) may be stored in the license data store 110. Like some of the license rules configuration properties described above, exemplary fields in the entries include a license identifier field 205, a license name field 210, a license description field 215, a number of licenses field 220, a licensing metric field 225, a metric to license ratio field 230, a days of affinity field 235, a limit type field 240, an allowed tenancy field 245, a preserve history field 250, and a resource identifiers or usage field 255. In this embodiment, each entry represents a license rules configuration with an exemplary set of properties. For example, entry 290 relates to Windows Server and has a limit of two-hundred licenses that are consumed on a per physical core basis. As another example, entry 296 relates to a video rendering library license that is limited based on a function of metrics, namely consumption is permitted for hosts with four or fewer graphics processing units (GPUs) per CPU.

In some embodiments, the LMS 105 can track license usage using an array of objects in the resource identifiers or usage field 255. The array of objects includes names that correspond to resource identifiers and values that correspond to the number of licenses consumed by the respective resource identifier, as illustrated in the resource identifiers or usage field 255 for entry 290. To determine current usage, the LMS 105 can add up the total number of consumed licenses in the array. For example, based on the listed entries, the LMS 105 can determine that eight licenses have been consumed (i.e., five by the resource identified by "I-129381", two by the resource identified by "H-199121", and one by the resource identified by "MI-168246"). In other embodiments, the LMS 105 can track license usage by keeping a count of the total number of consumed licenses, as indicated by usage field 255 for entry 295. When a license is consumed (or released) by a resource, the LMS 105 increments (or decrements) the count by the number of licenses associated with that resource.

As described herein, users may create a "pool" of dedicated hosts referred to herein as a "host resource group." A host resource group is a collection of dedicated hosts that can be managed together as a single entity using preferences specified by the user, and the zero, one, or multiple hosts belonging to the host resource group can change over time. These management preferences include settings such as the automatic allocation and release of hosts, recovery behavior of hosts in case of a host failure, which license configurations to use, etc. A user may utilize host resource groups, as one example, by providing management preferences for the host resource group, attaching a license configuration to machine image, and then launching compute instances into the host resource group. As the user launches these instances, LMS 105 takes care of host allocation and placing instances into them based on the user-provided management preferences.

FIG. 3 is a diagram illustrating an exemplary user interface 300 for host resource group creation and sharing in a provider network according to some embodiments. In some embodiments, this user interface (UI) 300 can be provided by an electronic device 190 to an administrator 191 user (e.g., based on data provided by the LMS 105 or provider network 100). The user may use the UI to provide or select host resource group information for creating or editing a host resource group. The electronic device 190 may then send a request message to an endpoint associated with the LMS 105 (or another control plane entity of the provider network 100) to create or edit such a host resource group (e.g., with this data provided by the user via the UI 300), causing the LMS 105 to create or define a host resource group in accordance to the request.

For example, a user may use one or more UI elements 305 to provide host resource group information such as a host resource group name (e.g., "MYGROUP1" provided by a text input box UI element), a description of the host resource group, etc.

The user may also use one or more UI elements 310 to provide settings used by the LMS 105 to automatically manage dedicated hosts of a host resource group according to the user's preferences. For example, the user may use a UI element (e.g., a checkbox) to indicate whether the LMS 105 should allocate hosts automatically—e.g., whether LMS 105 can automatically allocate a new host into the host resource group on the user's behalf when there is not enough capacity available on an existing host (of the group) to launch a requested instance.

As another example, the user may use a UI element (e.g., a checkbox) to indicate whether the LMS 105 should release hosts automatically—e.g., to specify whether the LMS 105 should keep a host device allocated (e.g., reserved and operational for the user's account) or to release it when it no longer has an active instance running on it. This setting may thus enable a user to keep the host when licensing terms require the same hardware for a given license to be reused up to a certain period.

Additionally, or alternatively, the user may use a UI element (e.g., a checkbox) to indicate whether the LMS 105 should recover dedicated host devices automatically—e.g., to specify whether the instances running on a host can be moved to a new host in the typically very rare case of an unexpected host failure.

The user may also provide, via the UI element(s) 310, information specifying allowed instance types (or, "instance families") that may be run by the set of dedicated hosts. In some embodiments, users can specify a list of instances to limit the allowed instance families that can be launched into the host resource group. For example, users may choose a set of one or more instance families in a particular manner, e.g., a particular set of instance families in which different sizes of the instances can be run on a same host to allow better utilization of available capacity of the hosts.

The UI 300 may also include one or more UI elements 315 allowing the user to specify software-based license configurations (earlier defined or configured for the user's account) to be associated with the host resource group. In the illustrated example, a "drop down box" UI input element allows the user to associate one or more core/socket-based license configurations to the host resource group. Once license configurations are associated with the host group, the host resource group may be used exclusively for those license configurations, which can allow the LMS 105 to better utilize licenses (e.g., comparatively expensive licenses) by not using other licenses on the same host resource group.

In some embodiments, a user may also choose not to associate a license configuration to a host resource group. In that case, any core/socket-based license configuration may be allowed on the host resource group, and LMS 105 will better utilize dedicated host capacity irrespective of what licenses are used. Users may beneficially use this setting, e.g., when they have an unlimited number of licenses and would like to optimize for host utilization.

Optionally, as reflected by the dashed lines in FIG. 3, the UI 300 may also include one or more UI elements 320 allowing the user to specify other user accounts, organizations, groups, etc., that the host resource group is to be shared with. For example, the user may select (e.g., from a list of user accounts associated with the user's account, organization, group, etc.) or provide identifiers of one or multiple user accounts, organizations, or groups of user accounts. The LMS 105 may then, in some embodiments, issue one or more API calls to the RAM service 107 to configure the sharing of the host resource group after it has performed the workflow to create the host resource group.

Alternatively, in some embodiments the user may utilize another one or user interfaces to configure the sharing of a host resource group. As one example, after submitting information to create the host resource group (e.g., by selecting the "CREATE" button shown in FIG. 3), the user may thereafter be provided another user interface to configure its sharing. FIG. 4 is a diagram illustrating one such exemplary user interface 400 for host resource group sharing in a provider network according to some embodiments.

In some embodiments, this user interface 400 is provided and/or serviced by the RAM service 107 and allows users the ability to share one or more different types of cloud provider network resources with others. In some embodiments, when a user shares a resource with another account, then that account is granted access to the resource. Any policies and permissions that apply to the resource (from the perspective of the "primary" account) may then be applied to these other users, while the primary account retains full ownership of the resources that are shared.

In some embodiments, users share resources that they "own" by creating resource shares. To create a resource share, the user may specify a name for the share, identify which resources are to be shared, and the principals (e.g., other accounts, organizations, or groups such as organizational units) with whom to share the resource with.

When the owner of a resource shares it with another account, this account can access the shared resource just as if it was owned by that account—e.g., via the respective service's console, CLI, API, etc. The actions that users are allowed to perform vary depending on the resource type, e.g., based on Identity and Access Management (IAM) policies, service control policies, etc., allowing users to leverage existing security and governance controls.

For example, user interface 400 shows one exemplary interface for creating a resource share to share a host resource group. In the description user interface section 405, the user may utilize a UI element (e.g., a textbox) to provide input comprising a "name" for the share that is a descriptive name for the resource share.

In the "resources" user interface section 410, the user may select resources to add to the resource share. For example, the user may utilize a UI element (e.g., a dropdown box) to provide a "resource type" of the resource(s) to be shared that filters a list of shareable resources to only show resources of the selected type. The user may then (or alternatively) use a set of UI input elements (e.g., checkboxes or the like) to select one or more resources to be shared. In this case, the user specified a "resource type" of host resource groups, and has selected two different resource groups to be shared—a TESTING-GRP-1 HRG, and a PROD-GRP-1 HRG, which may represent a "testing" host resource group and a "production" host resource group, for example.

In the "principals" user interface section 415, the user may add principals to the resource share.

In some embodiments, users can share resources with any account within the service provider network. Thus, users may seek to restrict resource sharing (e.g, only to user accounts of a same organization) via a UI input element, e.g., by deselecting a checkbox to allow external accounts to be used as principals.

In some embodiments, for each principal to be added to the resource share, the user may use one or more UI elements to search for and/or select the principal. For example, the user may search for account information such as an account identifier/number (e.g., "123456789012" or "USER500"), an organizational identifier/name (e.g., "o-abcd1234efgh5678" or "MYORG1"), a group identifier/name (e.g., "MYORG1-ENGINEERING" or "ou-abcd1234-mnop5678qrst9098uv76"), etc.

In some embodiments, a user may also use a non-illustrated UI element to specify tags (e.g., a tag key and a tag value) to be applied to the resource share for easier visibility into the resource share in reports, other systems, etc.

The user may then submit the UI 400, e.g., by selecting the "CREATE" button, causing the RAM service 107 and/or LMS 105 to update HRG share records accordingly, distribute HRG share data 117, etc., as disclosed herein.

In some embodiments, users can add and remove resources and/or principals and/or custom tags to a resource share at any time. In some embodiments, users can delete a resource share when the user no longer desires to share the resource(s).

In some embodiments, upon adding a user to a resource share, the RAM service 107 may send an invitation to join the resource share, and the user may accept it to gain access to the shared resources, e.g., by accepting or rejecting the share via a UI or by sending API calls, e.g., sending accept-resource-share-invitation or reject-resource-share-invitation messages to the RAM service 107.

In some embodiments, the accepting and/or rejecting of a share may not be used or required, and thus the share may be automatically added to each users' accounts. As one example, if a resource is shared to an organization and sharing within the organization is enabled, principals may automatically be granted access to the shared resources and may not receive these invitations.

Figure 5:
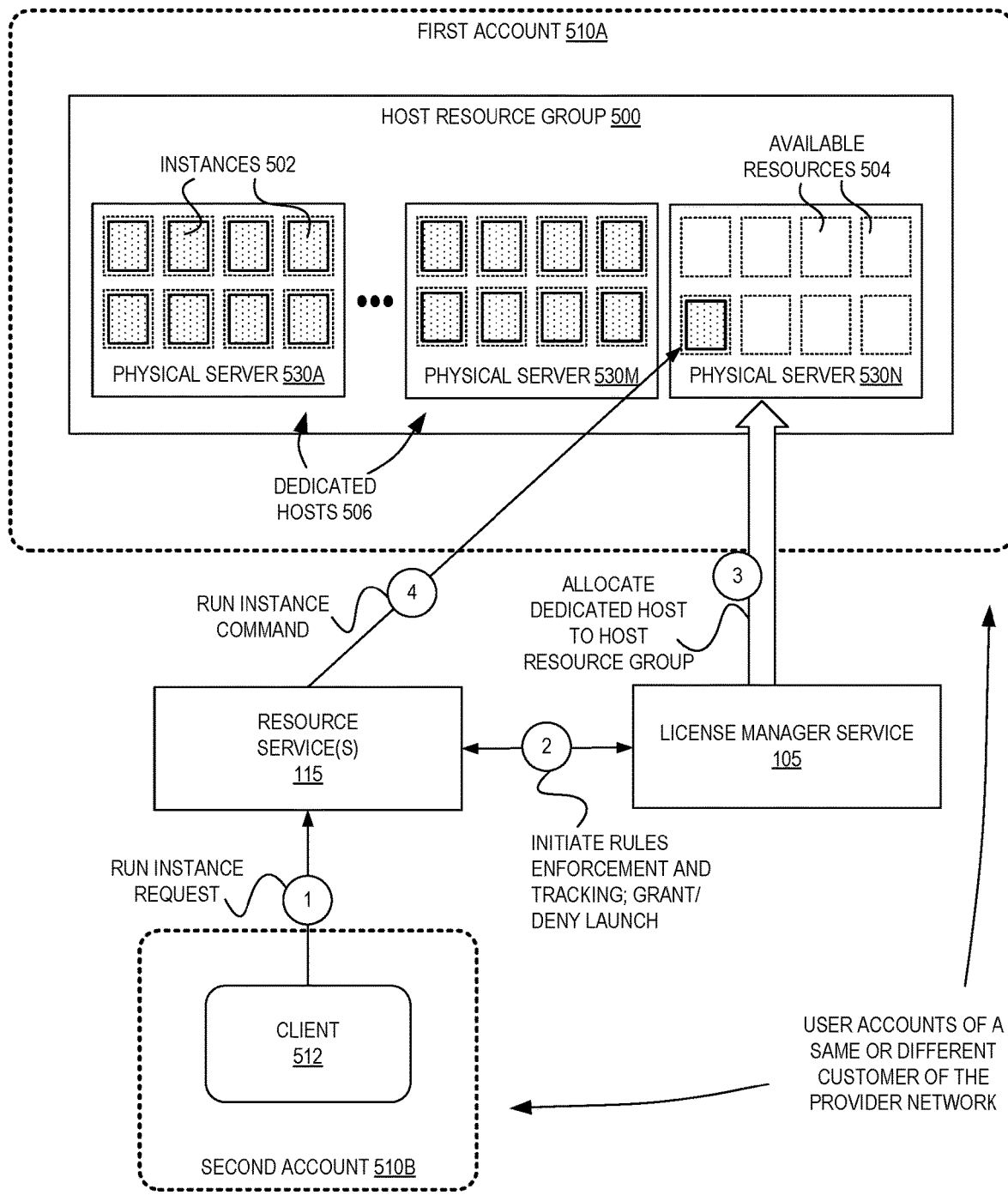
FIG. 5 is a diagram illustrating an environment for synchronous allocation of dedicated host computing devices into the host resource group of a customer account for placing a compute instance with a second account according to some embodiments.

With these systems in place, "secondary" users may thus "launch into" the host resource group of the other "primary" user, which may further be automatically managed by the LMS 105 on behalf of the primary user. For example, FIG. 5 is a diagram illustrating an environment for synchronous allocation of dedicated host computing devices into the host resource group of a customer account for placing a compute instance with a second account according to some embodiments. As described herein, a primary user account (e.g., first account 510A) may create a host resource group 500 of dedicated hosts 506, which as illustrated initially includes physical servers 530A-530M running a group of instances 502 on behalf of one or multiple different accounts.

When the primary user (associated with the first account 510A) creates a resource share to share the host resource group 500 with a second account 510B, the second account 510B can then use the host resource group 500. For example, a client 512 (e.g., a web browser, a software component that is part of an application, etc.) associated with the second account 510B may issue a run instance request at circle (1) to a resource service 115 (e.g., a hardware virtualization service), which may or may not identify the host resource group 500. Thus, the run instance request may identify an instance type and the host resource group (e.g., such as when there may be one or multiple possible host resource groups available to launch into), or the run instance request may identify a machine image or launch template, either being associated with a license, which may thus be used to identify a license configuration and an associated host resource group, as one example. The resource service 115 at circle (2) may send a message to the LMS 105 to initiate a rules enforcement associated with the license and determine whether the client 512 may launch into the host resource group, which may be determined by the LMS 105, the resource service 115, or both (e.g., using the HRG share data 117). For example, the LMS 105 may send a request message to a RAM service 107 seeking an indication of whether an account may launch into an HRG, and receive a response message indicating yes or no.

It may be than an available slot for the launch exists within the host resource group 500, and thus the LMS 105 or resource service 115 (e.g., based on information from the LMS 105, such as an identifier of one or more physical servers 530 or the host resource group itself)) may identify a slot for the instance and cause it to be launched, e.g., via a run instance command at circle (4). However, in some embodiments if there are no existing slots that are sufficient for the launch (e.g., in terms of resource availability amounts/types, and/or whether an existing slot in the host resource group 500 is provided by a host using a satisfactory license), the resource service 115 and/or LMS 105 may cause a new host—here, physical server 530N—to be allocated to the host resource group 500 of the first account 510A as shown by circle (3), any required licenses to be associated with the host, and thereafter used to launch the instance via a run instance command at circle (4). By way of example, if this client 512 were to subsequently cause the new instance to be terminated (and it was the only instance on the host at the time of termination), in some embodiments the resource service 115 and/or LMS 105 may cause the now-empty dedicated host server 530N to be deallocated and "removed" from the host resource group 500, providing cost savings to the first account 510A as well as making the host available for other users and/or uses, increasing the overall utilization and thus, efficiency, of the entire provider network.

Figure 6:
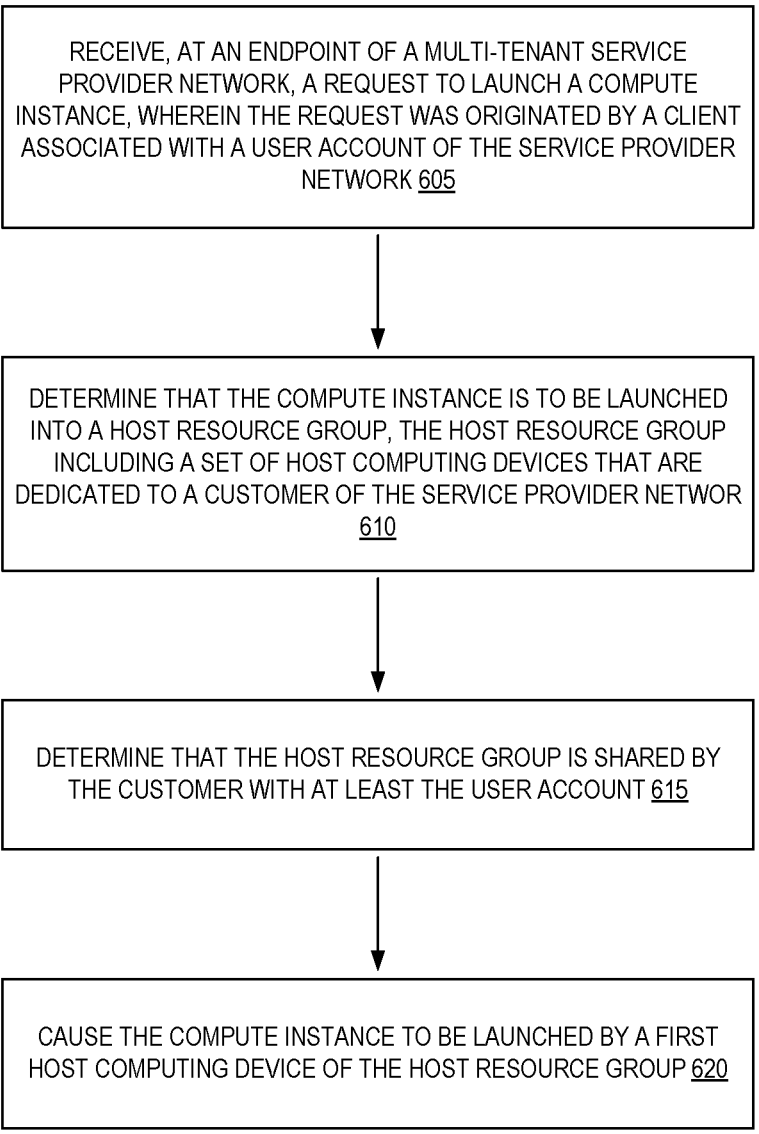
FIG. 6 is a flow diagram illustrating operations of a method for cross-account sharing of dedicated host computing devices in a service provider network according to some embodiments.

FIG. 6 is a flow diagram illustrating operations 600 of a method for cross-account sharing of dedicated host computing devices in a service provider network according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the LMS 105, RAM service 107, and/or resource services 115 shown in the other figures.

The operations 600 include, at block 605, receiving, at an endpoint of a multi-tenant service provider network, a request to launch a compute instance, where the request was originated by a client associated with a user account of the service provider network.

In some embodiments, the request to launch the compute instance does not include any identifier of the host resource group. In some embodiments, the request to launch the compute instance comprises a request to launch a machine image, wherein the machine image is associated with a software license, and wherein the host resource group is also associated with the software license.

The operations 600 include, at block 610, determining that the compute instance is to be launched into a host resource group, the host resource group including a set of host computing devices that are dedicated to a customer of the service provider network.

The operations 600 include, at block 615, determining that the host resource group is shared by the customer with at least the user account. In some embodiments, block 615 includes performing a lookup into a data structure to identify a mapping between an identifier of the host resource group and an identifier of the user account. In some embodiments, block 615 includes determining that the user account is part of an organization or a group selected by the customer to be able to utilize the host resource group.

In some embodiments, the operations 600 further include determining that the compute instance is unable to be placed within the set of host computing devices of the host resource group; and prior to block 620, allocating a first host computing device into the set of host computing devices of the host resource group of the customer. In some embodiments, determining that the compute instance is unable to be placed within the set of host computing devices of the host resource group includes determining that the set of host computing devices does not include any host computing device having both available capacity for the compute instance and a software license required for the compute instance.

The operations 600 include, at block 620, causing the compute instance to be launched by a first host computing device of the host resource group.

In some embodiments, the operations 600 further include receiving, from one or more clients associated with the customer, a first one or more request messages to create the host resource group and to associate a software license configuration with the host resource group. In some embodiments, the operations 600 further include receiving, from the one or more clients associated with the customer, a second one or more request messages to share the host resource group with the user account, an organization, or a group; and causing the host resource group to be shared with the user account, the organization, or the group. In some embodiments, the second one or more request messages are to share the host resource group with the organization or the group; at the time of the host resource group being shared with the organization or the group, the user account did not exist or was not yet associated with the organization or the group; and prior to the receiving of the request to launch the compute instance, the user account became associated with the organization or the group.

In some embodiments, the operations 600 further include receiving a request to remove the host resource group from being shared with the user account; transmitting an eviction notice message (e.g., carrying data to be presented the a user associated with the user account); and after an amount of time, interrupting a continued execution of the compute instance by the first host computing device.

Figure 7:
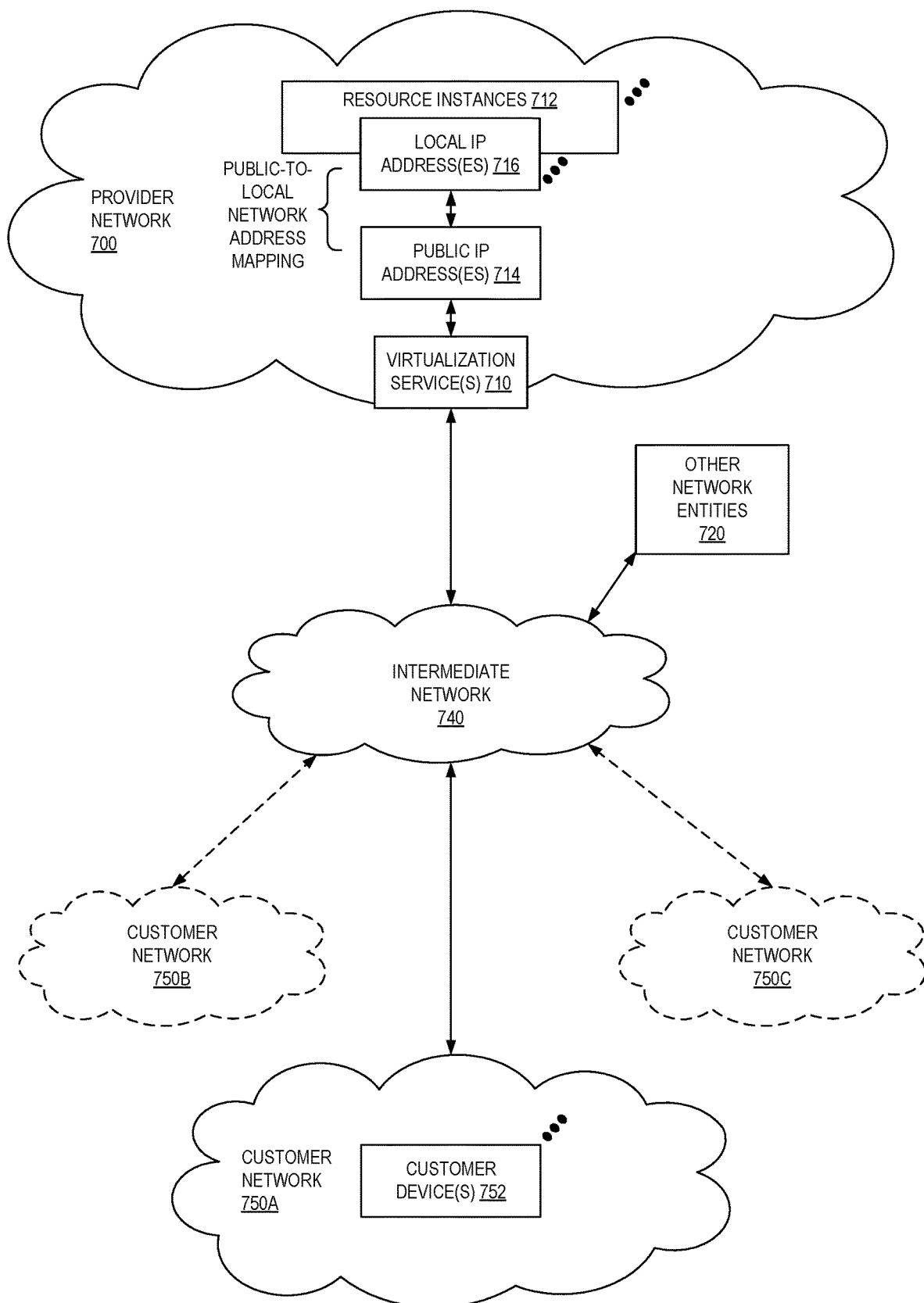
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
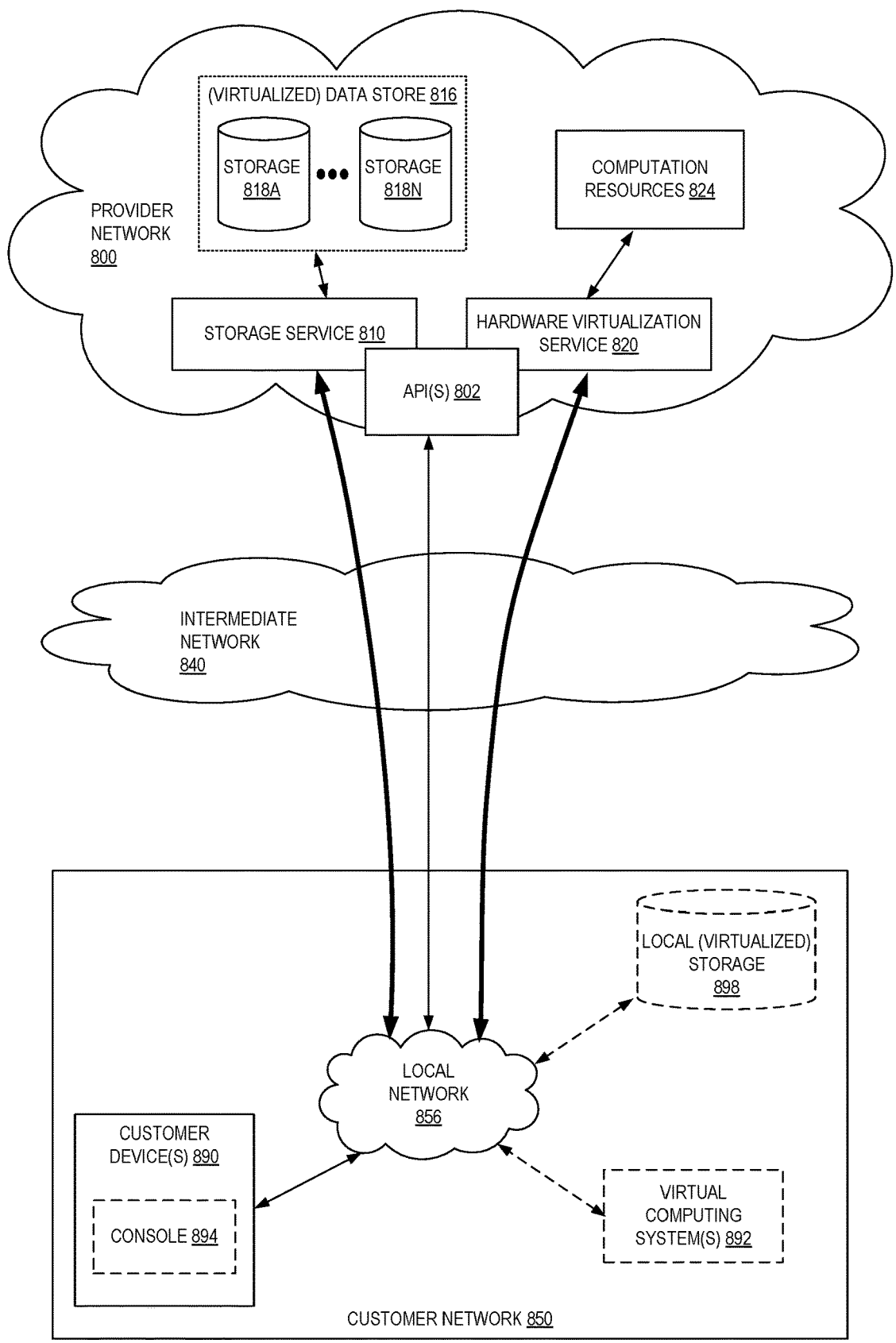
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative Systems

Figure 9:
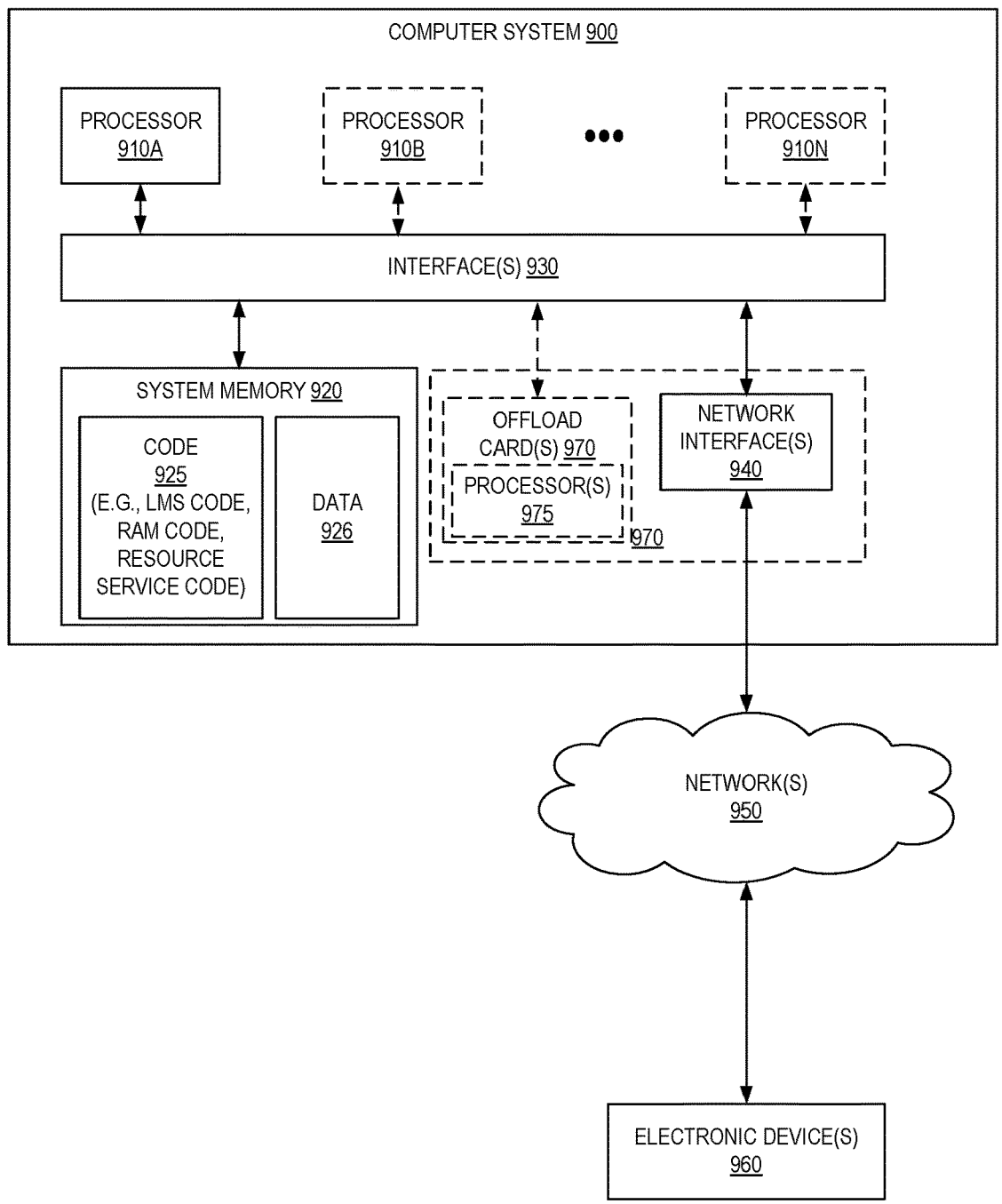
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 (e.g., LMS code executable to implement, in whole or in part, the license manager service 105, RAM code executable to implement, in whole or in part, the RAM service 107, resource service code executable to implement, in whole or in part, the resource services 115, etc.) and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, over one or more networks at a service provider network, a first one or more request messages to create a host resource group within the service provider network, wherein the first one or more request messages are originated by a computing device associated with a customer of the service provider network, wherein the host resource group is to include host computing devices that are dedicated to the customer for running compute instances;
receiving, over the one or more networks at the service provider network, a second one or more request messages to share the host resource group with one or more accounts, organizations, or groups;
receiving, at the service provider network, a request to launch a compute instance, wherein the request was originated by a client associated with a user account of the service provider network, and wherein the request includes an identifier of a machine image but does not include an identifier of the host resource group;
determining that the compute instance is to be launched into the host resource group;
determining, by a license manager service of the service provider network based on a lookup into a data structure to identify a mapping between an identifier of the host resource group and an identifier of the user account, that the host resource group is shared by the customer with at least the user account;
determining that no host computing device within a set of host computing devices currently forming the host resource group includes both an available slot to host the compute instance and a host-associated license required by the compute instance;
based on the determining that no host computing device within a set of host computing devices currently forming the host resource group includes both an available slot to host the compute instance and a host-associated license required by the compute instance, and based on the determining that the host resource group is shared by the customer with at least the user account, determining to allocate a host computing device into the host resource group of the customer to run the compute instance for the user account;
allocating the host computing device into the host resource group; and based on allocating the host computing device into the host resource group of the customer to run the compute instance for the user account, causing the compute instance to be launched by the host computing device.

2. The computer-implemented method of claim 1, wherein determining that the host resource group is shared by the customer with at least the user account is performed by the license manager service of the service provider network based on data provided by a resource access manager service of the service provider network.

3. The computer-implemented method of claim 1, wherein:
the machine image is associated with a software license; and
the host resource group is also associated with the software license.

4. A computer-implemented method comprising:
receiving, at an endpoint of a service provider network, a request to launch a compute instance, wherein the request was originated by a client associated with a user account of the service provider network, and wherein the request includes an identifier of a machine image but does not include an identifier of a host resource group;
determining that the compute instance is to be launched into the host resource group, the host resource group including a set of host computing devices that are dedicated to a customer of the service provider network;
determining, by a license manager service of the service provider network based on a lookup into a data structure to identify a mapping between an identifier of the host resource group and an identifier of the user account, that the host resource group is shared by the customer with at least the user account;
determining that the compute instance is unable to be placed within the set of host computing devices of the host resource group, including determining that no host computing device within the set of host computing devices of the host resource group includes both an available slot to host the compute instance and a host-associated license required by the compute instance;
based on the determining that no host computing device within the set of host computing devices of the host resource group includes both an available slot to host the compute instance and a host-associated license required by the compute instance, and based on the determining that the host resource group is shared by the customer with at least the user account, allocating a first host computing device into the set of host computing devices of the host resource group of the customer; and
based on allocating the first host computing device into the set of host computing devices of the host resource group of the customer, causing the compute instance to be launched by the first host computing device of the set of host computing devices of the host resource group.

5. The computer-implemented method of claim 4, wherein the user account is part of an organization or a group selected by the customer to be able to utilize the host resource group.

6. The computer-implemented method of claim 4, further comprising:
receiving, from one or more clients associated with the customer, a first one or more request messages to create the host resource group and to associate a software license configuration with the host resource group.

7. The computer-implemented method of claim 6, further comprising:
receiving, from the one or more clients associated with the customer, a second one or more request messages to share the host resource group with the user account, an organization, or a group; and
causing the host resource group to be shared with the user account, the organization, or the group.

8. The computer-implemented method of claim 7, wherein:
the second one or more request messages are to share the host resource group with the organization or the group;
at the time of the host resource group being shared with the organization or the group, the user account did not exist or was not yet associated with the organization or the group; and
prior to the receiving of the request to launch the compute instance, the user account became associated with the organization or the group.

9. The computer-implemented method of claim 4, wherein the machine image is associated with a software license.

10. The computer-implemented method of claim 9, wherein the host resource group is also associated with the software license.

11. The computer-implemented method of claim 4, further comprising:
receiving a request to remove the host resource group from being shared with the user account;
transmitting an eviction notice message; and
after an amount of time, interrupting a continued execution of the compute instance by the first host computing device.

12. The computer-implemented method of claim 4, wherein determining that the host resource group is shared by the customer with at least the user account is performed by the license manager service of the service provider network based on data provided by a resource access manager service of the service provider network.

13. A system comprising:
a first one or more electronic devices to implement a hardware virtualization service in a service provider network, the hardware virtualization service configured to run compute instances on behalf of users of the service provider network on host computing devices, the hardware virtualization service including one or more processors and memory storing instructions that upon execution by the one or more processors of the hardware virtualization service cause the hardware virtualization service to:
receive a request to launch a compute instance, wherein the request to launch a compute instance comprises a request to launch a machine image and does not include an identifier of a host resource group;
a second one or more electronic devices to implement a resource access manager (RAM) service in the service provider network, the RAM service including one or more processors and memory storing instructions that upon execution by the one or more processors of the RAM service cause the RAM service to:
receive, from one or more clients associated with a customer of the service provider network, a first one or more request messages to share the host resource group with one or more user accounts, an organization, or a group, wherein the host resource group includes a set of host computing devices managed in part by the hardware virtualization service that are dedicated to the customer; and
a third one or more electronic devices to implement a license manager service in the service provider network, the license manager service including one or more processors and memory storing instructions that upon execution by the one or more processors of the license manager service cause the license manager service to:
determine that a compute instance sought to be launched on behalf of a user is to be launched into the host resource group;
determine, based on a lookup into a data structure to identify a mapping between an identifier of the host resource group and an identifier of a user account of the user, that the host resource group is shared by the customer with the user account of the user;
determine that the compute instance is unable to be placed within the set of host computing devices of the host resource group, including determining that no host computing device within the set of host computing devices of the host resource group includes both an available slot to host the compute instance and a host-associated license required by the compute instance;
based on the determining that no host computing device within the set of host computing devices of the host resource group includes both an available slot to host the compute instance and a host-associated license required by the compute instance, and based on the determining that the host resource group is shared by the customer with the user account of the user, allocate a first host computing device into the set of host computing devices of the host resource group of the customer; and
based on allocating the first host computing device into the set of host computing devices of the host resource group of the customer, cause the compute instance to be launched by the first host computing device of the set of host computing devices of the host resource group.

14. The system of claim 13, wherein determining that the host resource group is shared by the customer with the user account of the user is performed by the license manager service based on data provided by the RAM service.

15. The system of claim 13, wherein determining that the host resource group is shared by the customer with the user account of the user comprises the license manager service sending a request to the RAM service for host resource group share data.

16. The system of claim 13, wherein the user account is part of an organization or a group selected by the customer to be able to utilize the host resource group.

17. The system of claim 13, wherein the license manager service further includes instructions that upon execution cause the license manager service to:
receive, from the one or more clients associated with the customer, a second one or more request messages to create the host resource group and to associate a software license configuration with the host resource group.

18. The system of claim 13, wherein the machine image is associated with a software license.

19. The system of claim 18, wherein the host resource group is also associated with the software license.

20. The system of claim 13, wherein the license manager service further includes instructions that upon execution cause the license manager service to:
receive a request to remove the host resource group from being shared with the user account of the user;
transmit an eviction notice message; and
after an amount of time, interrupt a continued execution of the compute instance by the first host computing device.

* * * * *